Jan. 7, 1947.  T. W. VICKERS  2,413,805
ELECTRICAL MACHINE
Filed Aug. 17, 1943  3 Sheets-Sheet 1

INVENTOR.
THEODORE W. VICKERS
Frederick Diehl
ATTORNEY

Jan. 7, 1947.                T. W. VICKERS                2,413,805
                            ELECTRICAL MACHINE
                    Filed Aug. 17, 1943         3 Sheets-Sheet 2
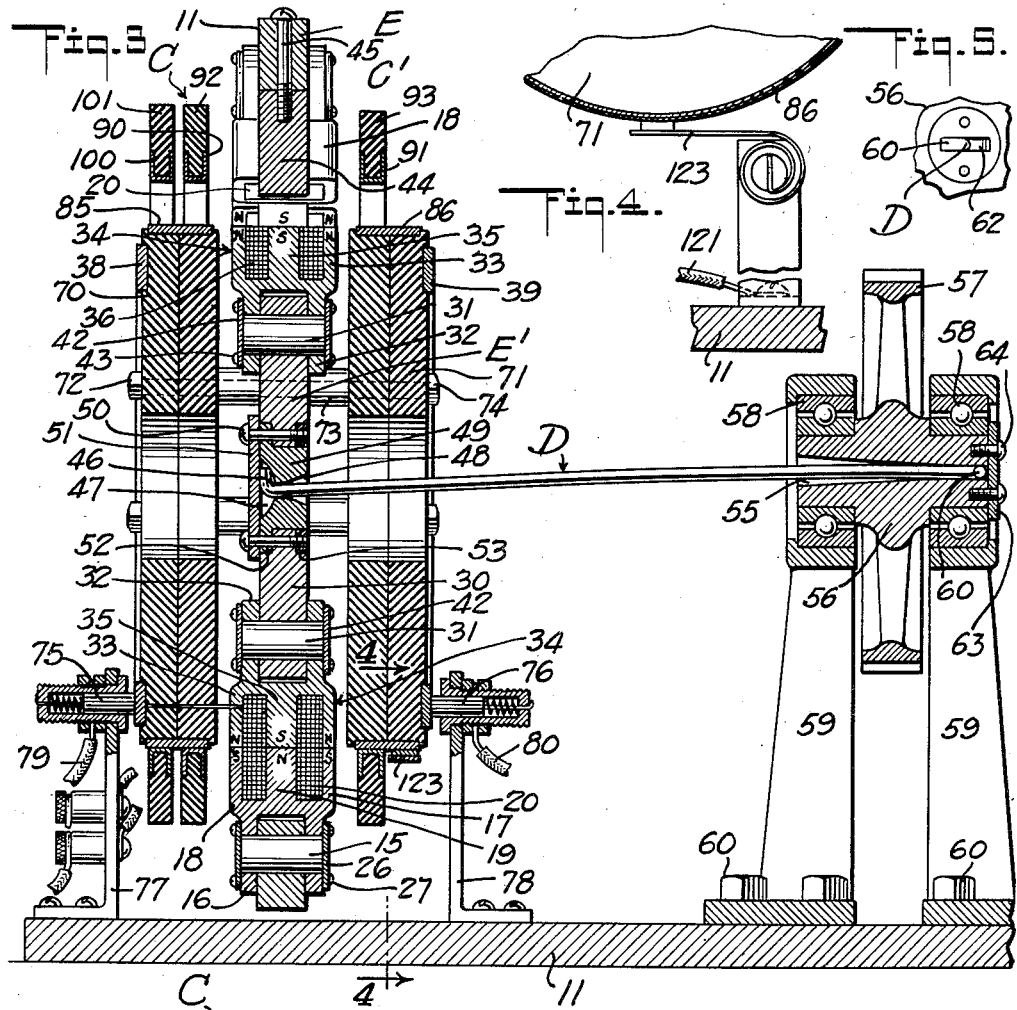
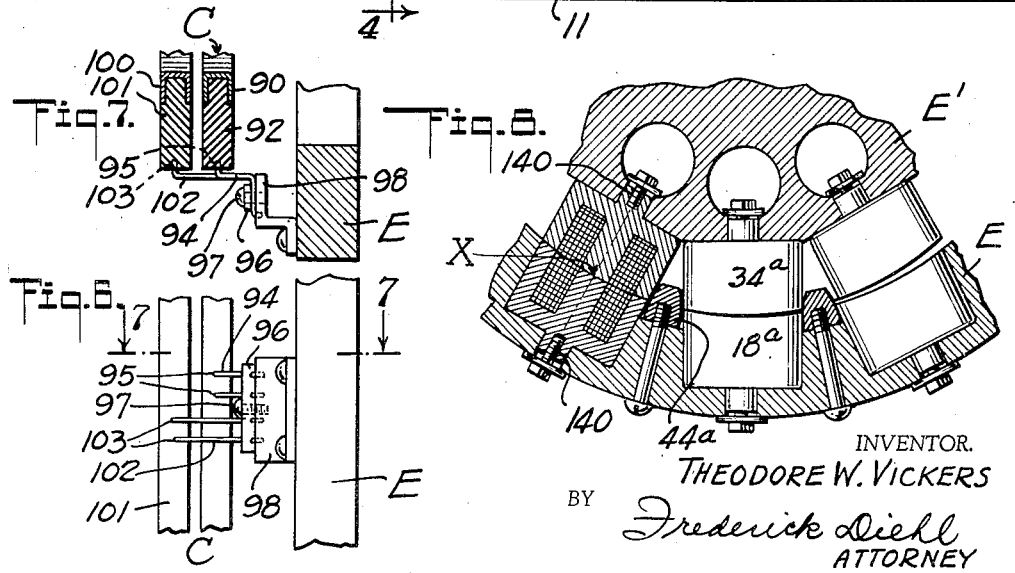
INVENTOR.
THEODORE W. VICKERS
BY Frederick Diehl
ATTORNEY

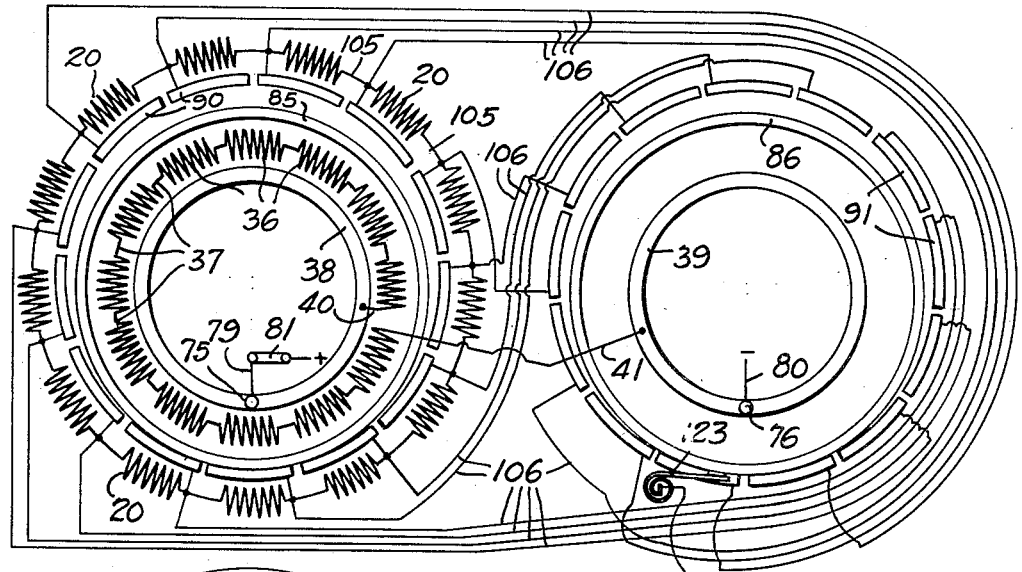
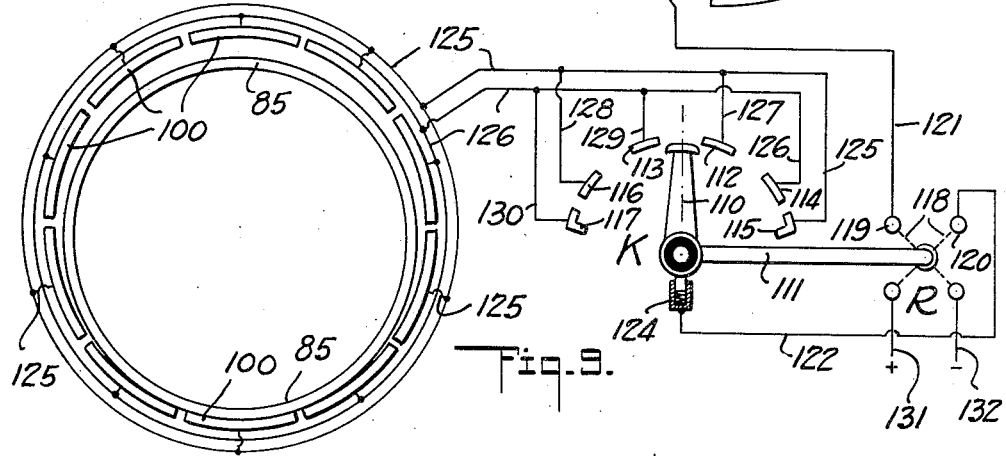
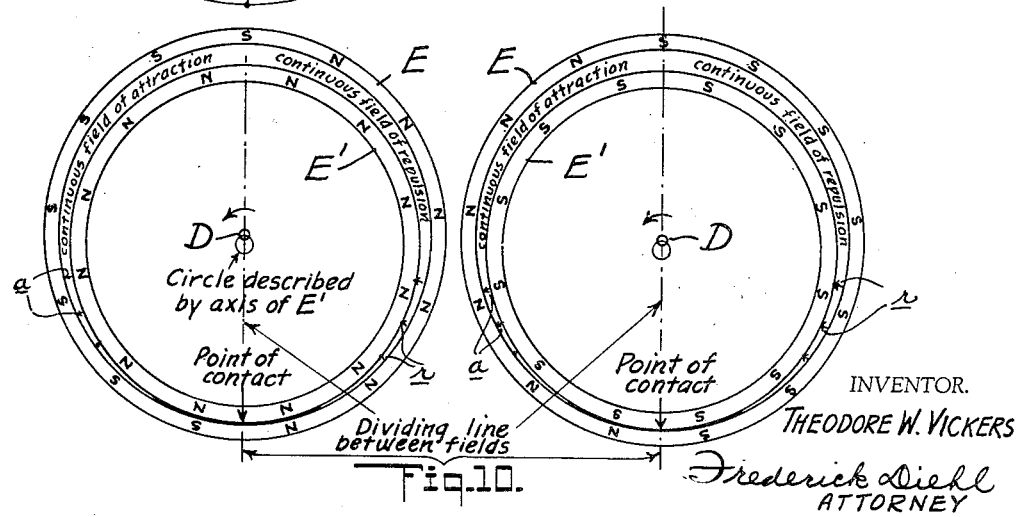

Patented Jan. 7, 1947

2,413,805

UNITED STATES PATENT OFFICE 2,413,805

ELECTRICAL MACHINE

Theodore W. Vickers, Los Angeles, Calif.

Application August 17, 1943, Serial No. 498,937

9 Claims. (Cl. 172—36)

This invention relates to electrical machines of the general character embodied in my Letters Patent No. 2,378,668, issued June 19, 1945, and wherein is disclosed and claimed, an electrical machine embodying relatively rotatable magnetic fields operatively associated to transform the compression of a magnetic field into mechanical force by moving the point of application of the force in a curvilinear path effecting continuous force displacement rotationally which can be utilized to perform useful work. More specifically, the machine utilizes one or more air gaps created between two magnetic elements of a machine, which are mounted to move relatively in a curvilinear path and are co-actable in response to a force acting continuously across the air gap, to translate the acting force into the relative movement of the elements, all while maintaining the gap and causing it to progress in a manner to continue the relative movement between the elements.

In a preferred form, the machine is composed of two electromagnetic elements, one of which is fixed and the other rotatable therein in hypocyclic relationship thereto, with suitable electrical windings carried by the two elements and included in electric circuits such as to maintain magnetic fields of attraction and repulsion between the elements at opposite side of their point of rolling contact, which fields progress with such point of rolling contact, to thus maintain a magnetic torque continuously acting upon the rotatable element to rotate same. The two electromagnetic elements, in their hypocyclic relationship, define spaced air gaps between the elements which are respectively opening and closing progressively in response to rotation of the rotatable element, with the elements being magnetically energized in a manner to create the magnetic fields of attraction and repulsion across the respective air gaps, and thus produce mechanical forces across the gaps operable to rotate the rotatable element.

In the invention of the above identified patent, only one coil is used for the non-rotating magnetic field, whereas in the present invention there is provided multiple coils connected in series to produce this non-rotating field. Furthermore, in the invention of the patent, the rotor element rolls on a track of the stator element and depends on the coefficient of friction between the elements to produce useful torque, whereas in the present invention the coils of the rotor element mate and are maintained in a definite relationship circumferentially by lugs, gear teeth, or equivalent means, which prevent slipping with the attending loss of useful torque.

The present invention has, in addition to the objects and advantages above set forth, many others among which are the following:

1. To shorten the path of the magnetic field with the attending saving in the amount of metal required in the construction of the electromagnetic elements for a given torque output, thus increasing the electrical efficiency of the machine.

2. To eliminate stray magnetic fields by a novel construction and arrangement of the windings of the electromagnetic elements which increases the concentration of magnetic flux across the air gap, and hence increase the magnetic pull.

3. To so mount the electromagnetic elements for relative rotation and operative association with a power transferring means, that the rotatable element will be maintained against axial displacement while being mechanically free to move in any direction parallel to a plane perpendicular to its axis, so as to enable the torque to be transmitted to the power transferring means with maximum efficiency.

4. To positively maintain a predetermined circumferential relationship between the hypocyclically associated electromagnetic elements, to insure the most efficient co-action between the windings of the elements at all times, and to prevent any such slippage as would change the operative relationship between the elements and cause the machine to stop.

5. To control the operation of the machine in such manner that the rotatable electromagnetic element can be intermittently rotated very small amounts progressively in either direction, or rotated continuously in either direction at the will of the operator.

6. To enable the electromagnetic elements to be locked against relative rotation in response to a predetermined control of the supply of current to the elements, so that the machine can be utilized as a brake in any environment.

7. To utilize the rotating field of polyphase currents to operate the machine in lieu of a commutating mechanism for creating the magnetic field.

8. To provide a novel arrangement of electromagnets either rockably or rigidly mounted on the magnetically associated elements, by which the magnets of one element magnetically co-act successively with the magnets of the other element in effecting a continuous force displacement rotationally by an intense concentration of magnetic flux across the air gap developing extremely high torque upon the rotatable element, the rockable mounting of the magnets producing a torque-multiplying toggle joint effect and tending to obviate slipping between the elements, as well as reduce to a minimum, rolling friction between the magnets of the elements at their point of engagement.

With these and other objects in view, the invention resides in the combinations, arrangements and functional relationships of elements as set forth in the following specification and particularly pointed out in the appended claims.

In the accompanying drawings:

Figure 3 is an enlarged longitudinal sectional view taken on the line 3—3 of Figure 1;

Figure 4 is a fragmentary sectional view taken on the line 4—4 of Figure 3;

Figure 5 is a fragmentary view in elevation, of an operative connection embodied in the machine;

Figure 6 is a fragmentary plan view of the commutator support embodied in the invention;

Figure 7 is a sectional view taken on the line 7—7 of Figure 6;

Figure 8 is a fragmentary sectional view of a modified form of mounting for the magnets of the electromagnetic elements;

Figure 9 is a diagrammatic view of the electrical circuits embodied in the invention; and Figure 10 is a diagrammatic view illustrating the polarities and magnetic fields produced in the machine:

Figure 1:
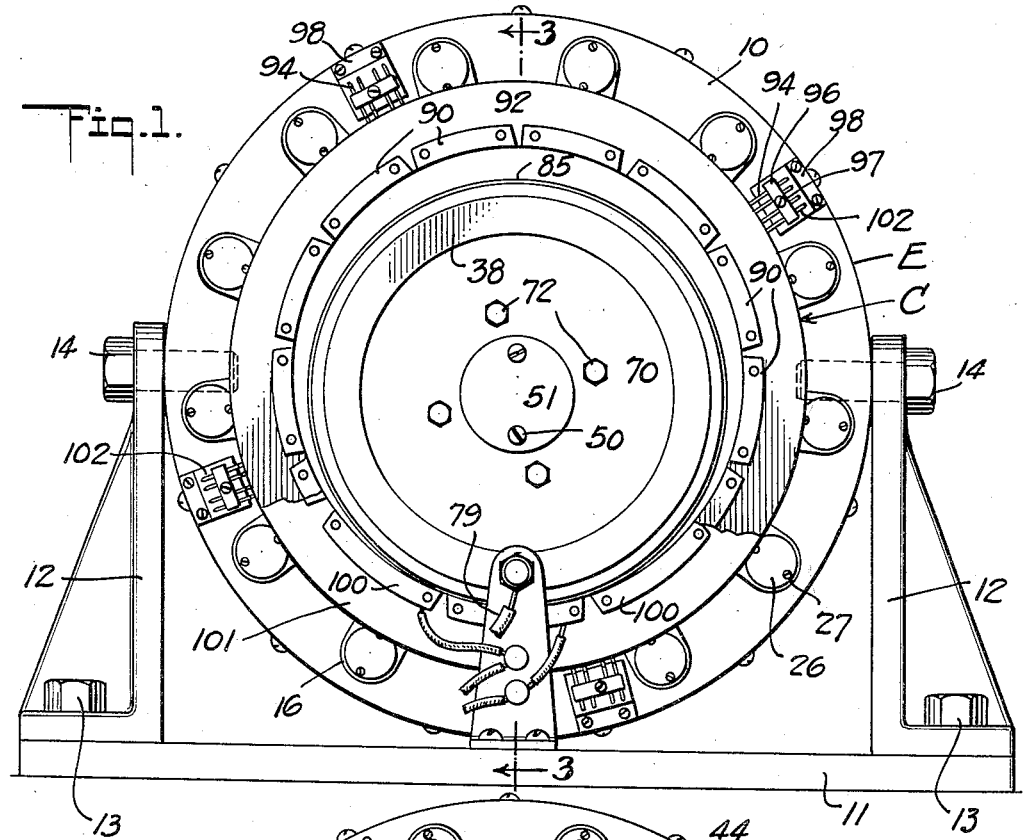
Figure 1 is a view in end elevation, of one form of electrical machine embodying this invention.

Referring specifically to the drawings, the invention as shown is adapted for operation by direct current in conjunction with a commutating mechanism, but it will be understood that alternating current of polyphase character can be used instead. In its illustrated embodiment the invention comprises relatively rotatable electromagnetic elements E and E' disposed in eccentric relationship, with the inner element rotatable and operatively connected to a driven member D. However, it will be understood that the outer element can be the rotatable element and the inner element the stationary one without departing from the spirit and scope of the invention.

The element E constitutes a stationary field of the machine and comprises an annular metal body 10 supported from a base 11 in a vertical position by brackets 12 secured to the base by bolts 13, and to the element E at diametrically opposite points by bolts 14. At equally spaced locations circumferentially the element E is provided with a series of co-axial openings receiving pins 15 also passing through registering openings in spaced ears 16 projecting from the cup-shaped iron bodies 17 of a set of radially disposed electromagnets 18 to pivotally mount the latter on the element E for a very slight rocking motion or play which is definitely limited by engagement of the bottom edges of the bodies 17 with a shoulder formed by the internal annular surface of the element, all for a purpose to be later described.

Iron cores 19 project from the bodies 17 radially and centrally thereof, and are provided with windings 20. The pins 15 are confined against axial displacement by cover plates 26 secured to the ears 16 by screws 27.

The element E' constitutes a rotor or armature of the machine and is composed of a disk 30 having co-axial openings at equally spaced points circumferentially receiving pivot pins 31 also passing through registering openings in spaced ears 32 projecting from the cup-shaped iron bodies 33 of a second set of electromagnets 34 to pivotally mount the latter on the element E' for a very slight rocking motion or play which is definitely limited by engagement of the bottom edges of the bodies 33 with a shoulder formed by the peripheral surface of the element E' for a purpose to be later described. Cores 35 project radially from the bottom walls of the bodies 33 centrally thereof and are provided with windings 36 electrically connected in series with each other by conductors 37, and in series with contact rings 38 and 39 by conductors 40 and 41 (Figure 9), the contact rings forming parts of commutating mechanisms C and C' to be later described in detail. Cover plates 42 secured to the ears 32 by screws 43, confine the pins 31 against axial displacement.

Figure 2:
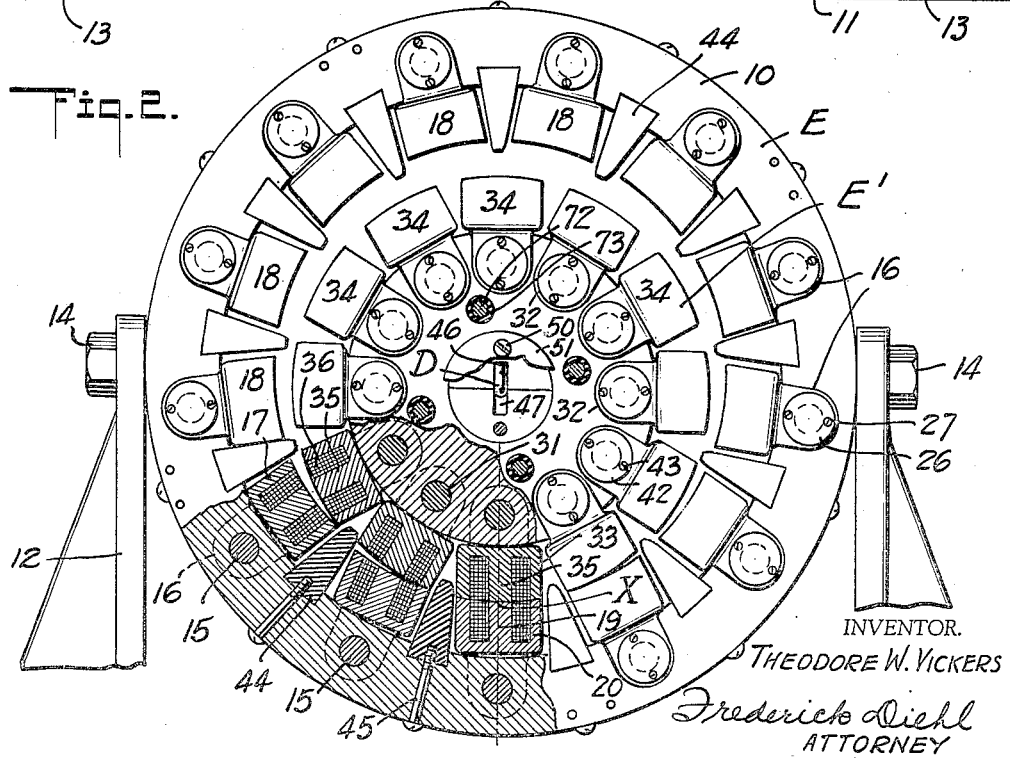
Figure 2 is a view similar to Figure 1, with the commutating mechanism broken away, and portions of the electromagnetic elements in section.

The outside diameter of the element E' defined by the outer surfaces of the bodies 33 which form parts of a circle as shown in Figure 2, is less than the inside diameter of the element E as defined by the inner surfaces of the bodies 17 which form parts of a larger circle as also shown in this figure. The difference between these two diameters is sufficient for the element E' to be eccentrically disposed within the element E so as to be in hypocycloidal relation to the latter, and with the number of magnets carried by the element E being greater than that of the number of magnets 34 of the element E'. In the present instance thirteen of the magnets 18 are shown, whereas twelve of the magnets 34 are provided. It should be understood that the magnets must be equally spaced upon their respective elements so that during rolling contact of the confronting surfaces of the magnets in response to rotation of the element E', the magnets of one element will become alined with the magnets of the other element in successive order at the point of rolling contact of the magnets as indicated at X in Figure 2. Non-magnetic teeth 44 are secured by screws 45 to the element E between adjacent magnets 18, and project between adjacent magnets 34 of the element E' so as to prevent relative circumferential displacement of the elements and thus insure that the aforestated alinement of the magnets will be positively maintained at all times.

The driven member D comprises a resilient or spring shaft having a laterally projecting key 46 at one end received in a diametric recess 47 at one end of a central bore 48 in the two parts of a cylindrical head 49 secured in a central opening in the disk 30 of the element E' by headed screws 50 which pass through a retainer plate 51 for the key 46, through a flange 52 on the head 49, through the disk 30, and are threaded into a clamping ring 53, to the end of operatively connecting the shaft D to the element E' for rotation by the latter.

The other end of the shaft D projects into a flaring bore 55 in the hub 56 of a gear 57 or other power transferring element, which is journaled co-axially of the element E in bearings 58 supported by brackets 59 secured to the base 11 by screws 60. Said other end of the shaft D has a laterally projecting key 61 received in a diametric slot 62 in the hub 56, and retained against displacement from the slot by a cover plate 63 secured to the hub by screws 64. It will be clear that as rolling movement of the element E' within the element E eccentrically thereof is effected, the shaft D will be correspondingly rotated so as to transmit the motion to the gear 57 while the shaft flexes in a plane perpendicular to the axis of the element E.

The commutating mechanisms C and C' above referred to are composed of circular, two-part supports 70 and 71 of insulating material rigidly secured to the element E' at opposite sides of the latter and in co-axial relation thereto by bolts 72 passing through the supports and through spacer tubes 73. Nuts 74 co-act with the bolts 72 to clamp the aforestated parts together. The contact rings 38 and 39 are fixed in annular recesses in the outer sides of the supports 70 and 71 respectively, and are constantly engaged by spring-pressed brushes 75 and 76 carried by holders 77 and 78 secured to the base 11. The brushes 75 and 76 are connected by conductors 79 and 80 to a suitable source of direct current supply under control of a switch 81 (Figure 9) so that the windings 36 of the magnets 34 can be energized or de-energized as desired.

Other contact rings 85 and 86 are fixed in peripheral grooves in the supports 70 and 71 respectively. Two sets of operating contact segments 90 and 91 have rolling engagement with the contact rings 85 and 86 respectively, and each set consists of thirteen segments, one for each magnet of the element E. The two sets of contact segments 90 and 91 are fixed to ring supports 92 and 93 respectively, of insulating material which are yieldingly mounted in co-axial relationship to the element E by pairs of L-shaped wire springs 94 seating at one end in sockets 95 in the ring supports, and secured by cross bars 96 and screws 97 to brackets 98 fixed to the body 10 of the element E (Figures 1, 6 and 7).

A set of control contact segments 100 of which ten are provided as an illustration, are fixed to a ring support 101 of insulating material mounted alongside the support 70 for rolling engagement of the segments 100 by the contact ring 85. The support 101 is yieldingly mounted in co-axial relationship to the element E by pairs of L-shaped wire springs 102 seating at one end in sockets 103 in the support 101 and secured by the aforementioned cross bars 96 and screws 97 to the brackets 98.

The operating contact segments 90 and 91 are connected to the ends of the windings 20 of the magnets 18 by conductors 105 in a manner somewhat similar to that in which the armature coils of a direct current machine are connected to its commutator segments, it being necessary in order to maintain the proper relation between the magnetic field of the element E' and the magnets 34, that one side always be attracting and the opposite side always be repelling as indicated in Figure 10.

It will also be noted from Figure 9 that the circumferential relationship of the two sets of contact segments 90 and 91 to each other is such that they are relatively displaced one half the angular distance between them, so that only one winding 20 is shorted at any time, with seven windings in series on the repulsion side and six windings in series on the attracting side. This is the preferred arrangement, as on the attracting side the increasing magnetic flux should produce a counter E. M. F., whereas on the repulsion side the decreasing magnetic flux should poduce a helping E. M. F.

By means of conductors 106, the contact segments 90 are connected to those contact segments 91 which are substantially diametrically opposite to the contact segments 90 as shown in Figure 9. By reference to Figure 10, it will be noted that the magnetic field of the element E is divided into two parts, caused by the arrangement of polarities of the magnets 18 as shown in this figure. Furthermore, it will also be noted from this figure that the element E' has a north polarity at one end and a south polarity at its other for co-action with the element E in maintaining the continuous fields of attraction and repulsion in the necessary operative relation to produce the desired relative rotational movement between the elements.

The control segments 100 are included in a control circuit with a control or selector switch designated generally at K in Figure 9. This switch comprises a contact arm 110 fixed to and insulated from a shaft 111 and adapted to be adjusted to engage either the right hand contact 112, or left hand contact 113, or to span the right hand pair of contacts 114, 115, or the left hand pair of contacts 116, 117. The cross contact arm 118 of a conventional reversing switch R is also fixed to the shaft 111, and two of the contacts 119 and 120 of this switch are connected by conductors 121 and 122 respectively, to brushes 123 and 124. The brush 123 bears against the contact ring 86, whereas the brush 124 bears against the hub of the contact arm 110, all as shown in Figure 9.

As also shown in Figure 9, alternate control contact segments 100 are connected by conductors 125, 127 and 128 to the control contact 115 of the right hand pair, right hand control contact 112, and contact 116 of the left hand pair, respectively, whereas the other alternate control contact segments 100 are connected by conductors 129, 126 and 130 to the left hand control contact 113, the contact 114 of the right hand pair, and the contact 117 of the left hand pair, all for a purpose to be described in the operation of the invention which is as follows:

With the switch 81 (Figure 9) closed, and the conductors 79 and 80 in circuit with a source of current supply, the set of magnets of the element E' will be energized, as current from the supply source will flow through the brush 75, contact ring 38, conductor 40, windings 36, conductor 41, contact ring 39, brush 76 to the other side of the line.

Let it be assumed that the contact arm 110 of the control switch K is moved to the extreme right so as to engage the contacts 114, 115. With the terminals 131 and 132 of the reversing switch R also connected in circuit with the source of current supply, current will flow in one direction through the reversing switch, for example from the switch terminal 131 (one side of the line) through the switch R to switch terminal 120, the conductor 122, brush 124, contact arm 110, conductors 125 and 126 to all control contact segments 100, then through that one of the latter in contact with the contact ring 85, one of the contact segments 90, at which point the current divides through the windings 20 of the magnets 18 of the element E in the same manner as in a two pole drum wound direct current armature so as to cause the windings 20 at the right side of the point of contact between the elements E and E' in Figure 10 to be of one polarity, while those windings 20 at the left side of the point of contact to be of the opposite polarity to produce the distribution of the magnetic field as shown in Figure 10. Current from the windings 20 then flows through that one of the conductors 106 which is connected to the one of the contact segments 91 in contact with the contact ring 86, thence through the brush 123, conductor 121, switch terminal 119, through switch R to switch terminal 132, the other side of the line.

The fields of attraction and repulsion are now created between the elements E and E' to produce a torque upon the element E' in the direction of the arrow in Figure 10, as this element rolls within the element E in the opposite direction, it being understood that the two diagrams of this figure schematically illustrate the polarities existing at opposite ends of the machine at the same instant, when the machine is running. By means of the driving member D, the relatively slow rotational movement of the element E' resulting from its rolling motion hypocyclically or eccentrically within the element E, will be transmitted to the gear 57.

It will be noted that no torque is developed upon the element E' until same has moved an infinitesimal amount radially towards the element E in the field of attraction as indicated by the arrows a in Figure 10, and radially away from the element E in the field of repulsion as indicated by the arrows r. As the dividing of the magnetic field of the element E into its two parts having north and south polarities respectively, progresses rotationally in step with the rotational movement of the element E', the fields of attraction and repulsion are correspondingly advanced rotationally so as to continuously utilize the air gap pull to develop torque upon the element E'.

To develop torque upon the element E' in a direction opposite to that of the arrow in Figure 10, it is only necessary that the contact arm 110 of the control switch K be moved to the extreme left so as to engage the contacts 116, 117. During this movement of the contact arm 110, the contact arm 118 of the reversing switch R is actuated through the shaft 111 to actuate the reversing switch R and reverse the direction of current flow in identical the circuit as above traced out with the addition of the conductors 128 and 130 to connect the conductors 125 and 126 to the contacts 116 and 117, rather than to the contacts 114 and 115 as previously described.

The element E' can be rotated an extremely small part of a revolution in either direction and in a step by step movement progressively as desired. It is only necessary that the contact arm 110 of the control switch K be moved from its central "off" position shown in Figure 9, to engage either the right hand contact 112 or the left hand contact 113 which will complete the above described circuit with the current flowing in one direction or the other only so long as that one of the control segments 100 which happens to be in engagement with the contact ring 85, remains in engagement, it being clear that the following control segment 100 will not be included in the circuit due to the alternate connection of the control contact segments to the conductors 125 and 126 as clearly shown in Figure 9. For example, by moving the contact arm 110 of the control switch K back and forth to alternately engage the contacts 112 and 114, alternate contact segments 100 will be energized through the conductor connections 125 and 126, to progressively advance the element E' in one direction by completing the above described circuit only so long as that one of the segments 100 which happens to be in engagement with the contact ring 85, remains in engagement. As the following contact segment 100 will not be included in the circuit because of the connection of alternate segments 100 to the conductors 125 and 126, the element E' will be advanced an extremely small part of a revolution each time the contact arm is moved to engage the contact 112 or 114.

It will be understood that this slight rocking movement of the contact arm 110 does not transmit sufficient movement through the shaft 111 to actuate the reversing switch R and cause same to reverse the direction of current flow. Only by moving the contact arm 110 to the other side of the central "off" position shown in Figure 9, is the usual lost motion in the reversing switch R taken up and the switch actuated to reverse the relationship of the terminals 119 and 120 to the positive and negative terminals 131 and 132, so as to reverse the direction of current flow in the circuit.

Thus, it will be evident that with the arm 110 moved to said other side of the central "off" position (to the left in Figure 9) and then rocked back and forth to alternately engage the contacts 113 and 116, the above described circuit will again be completed with the current flowing in the opposite direction so as to progressively advance the element E' step by step in the opposite direction from that previously described. It will be manifest that the action of the reversing switch R in reversing the direction of current flow through the coils 20 of the element E, reverses the polarities from those shown for example, on the element E in Figure 10, thus enabling the reversal in the direction of rotation of the element E' to be effected as aforestated.

In the conversion of the force a (Figure 10) into rotating torque of the element E', the force is resolved into a lever system of the first class whose fulcrum coincides with the rolling point of contact between the elements E and E'; whose force arm is formed by a portion of the periphery of the element E' in the field of attraction; and whose weight arm is on the other side of the fulcrum. Thus it will be clear that continuous torque upon the element E' is produced by a lever system whose fulcrum advances with the rolling point of contact between the element E and E' and thus continuously acts upon the latter to effect its rotation.

By the provision of the rockable mounting of the magnets 18 and 34 on the respective pins 15 and 31 through extremely small angles, the rolling motion between the confronting faces of those two magnets which mate at the point of contact X, is changed into a walking motion so as to reduce to a minimum the rolling friction caused by pressure at such point of contact. Furthermore, this walking motion of the magnets under the torque enables two magnets of the element E to be in engagement with two magnets of the element E' at the same time so that at least one pair will always be holding to tend to maintain the alinement between magnets which is positively insured by the teeth 44.

Also by virtue of the rockable mounting of the magnets, a wedge shaped air gap is formed between any two magnets of a pair as their leading edges contact each other in approaching their position of full engagement and alinement at X.

It will be noted that the shaft D maintains the element E' in operative relationship to the element E, and that the element E' is free to move in any direction parallel to a plane perpendicular to its axis so that, mechanical frictional losses are reduced to a minimum.

Referring specifically to Figure 8, it will be noted that the rockable mounting of the magnets 18a and 34a of the elements E and E' is dispensed with, and that for a simple yet practical construction, the magnets are rigidly secured in radial positions on the respective elements by suitable screws 140 so that the confronting faces of the magnets will be in direct rolling engagement. Alinement of the magnets at the point of contact is positively maintained by interposed teeth 41a. The construction and operation of this form of the invention are otherwise identical to that previously described.

In summing up the operation, an important feature of the invention is its automatic functioning as a braking system. With the switch K in "off" position to discontinue the supply of current to the element E, while the switch 81 remains closed in order to continue the supply of current to the element E', the latter will be locked against movement, thus providing a powerful braking action which can be utilized in various mechanisms wherever a brake is required.

I claim:

1. An electrical machine of the class described comprising: two relatively rotatable electromagnetic elements disposed one within the other in hypocyclic relationship; each of said elements including a set of radially arranged magnets, with the outer ends of the magnets of one set disposed to engage the inner ends of the magnets of the other set at a predetermined point of contact, and to define air gaps between the elements at opposite sides of the contact point; means for supplying current to the magnets of the rotatable element to create a stationary magnetic field; means for supplying current to the magnets of the other element to create fields of attraction and repulsion respectively, across the air gaps so as to develop torque upon the rotatable element; means co-acting with the last means to advance the fields of attraction and repulsion with the rotatable element as the latter rotates, so as to continuously utilize the air gap pull to develop the torque; and means co-acting with said elements to maintain the magnets of one set in a predetermined relationship circumferentially of the elements, to the magnets of the other set and with magnets in alinement at said contact point so as to insure continuity of maximum electromagnetic efficiency between the two sets of magnets as the elements relatively rotate.

2. An electrical machine of the class described comprising: two electromagnetic elements; means mounting said elements one within the other in hypocyclic relationship for relative rotation, with the space between the elements forming an air gap; and means co-acting with the elements to electrically energize same so as to produce a torque-reacting pull across said air gap upon the rotatable element effecting rotation of the latter; said elements having interengaging means forming a positive operative connection between the elements preventing them from relatively slipping circumferentially under a load.

3. An electrical machine of the class described comprising: two relatively rotatable electromagnetic elements disposed one within the other in hypocyclic relationship; means for supplying current to the rotatable element to create a stationary field therearound; means for supplying current to the other of said elements to create magnetic fields of attraction and repulsion between the elements by which a torque-reacting air gap pull is developed upon the rotatable element; means co-acting with the last means to advance the fields of attraction and repulsion with the rotatable element as the latter rotates, so as to continuously utilize the air gap pull to develop the torque; and a control device operatively associated with the second said current supply means and including a switch having a plurality of means selectively operable to cause the rotatable element to be rotated continuously or with a step by step movement.

4. An electrical machine of the class described comprising: two relatively rotatable electromagnetic elements disposed one within the other in hypocyclic relationship; means for supplying current to the rotatable element to create a stationary magnetic field therearound; means for supplying current to the other of said elements to create magnetic fields of attraction and repulsion between the elements by which a torque reacting air gap pull is developed upon the rotatable element; means co-acting with the last means to advance the fields of attraction and repulsion with the rotatable element as the latter rotates, so as to continuously utilize the air gap pull to develop the torque; a contact ring mounted to rotate with the rotatable element in concentric relation thereto; a circular series of control contact segments concentrically related to the other of said elements and successively engaged by said ring during rotation of the rotatable element; and a control circuit for the second said current supply means including conductors connected to different ones of said control contact segments, and a switch by which said conductors are selectively included in the control circuit to supply current to said other element only so long as the contact ring is engaging the particular contact segment included in the circuit with the selected conductor, whereby a step by step movement of the rotatable element can be effected.

5. An electrical machine of the class described comprising: two relatively rotatable electromagnetic elements disposed one within the other in hypocyclic relationship; means for supplying current to the rotatable element to create a stationary magnetic field therearound; means for supplying current to the other of said elements to create magnetic fields of attraction and repulsion between the elements by which a torque-reacting air gap pull is developed upon the rotatable element; means co-acting with the last means to advance the fields of attraction and repulsion with the rotatable element as the latter rotates, so as to continuously utilize the air gap pull to develop the torque; a series of control contact segments; a contact member operatively connected to the rotatable element to successively engage said control contact segments during rotation of the rotatable element; and means by which the second said current supply means can be rendered active to selectively supply current through different ones of said contact segments to said other element only so long as the contact member is engaging the particular contact segment included in the circuit, whereby to correspondingly rotate the rotatable element.

6. An electrical machine of the class described comprising: two electromagnetic elements; means mounting said elements one within the other in hypocyclic relationship for relative rotation, with the space between the elements forming an air gap; means co-acting with the elements to electrically energize same so as to produce a torque-reacting pull across said air gap upon the rotatable element effecting rotation of the latter; a power transferring member mounted for rotational movement in laterally spaced co-axial relationship to the non-rotatable element; and a flexible driving member operatively connected axially to the rotatable element and to the power transferring member and adapted to flex laterally in rotating the latter in response to rotation of the rotatable element.

7. An electrical machine of the class described comprising: an outer body having a circular set of electromagnets whose cores are radially disposed; an inner body having a circular set of electromagnets whose cores are radially disposed for co-action of the magnets of the two sets in providing toroidal paths for the magnetic circuit between mating magnets as one of said bodies rotates hypocyclically relative to the other body; two circular sets of contact segments, two segments for each magnet of the first said set; means mounting said sets of contact segments on said outer body concentrically thereof; means electrically connecting the electromagnets of the first said set to the contact segments of one set and to the contact segments of the other set in circumferentially displaced relationship; contact rings, one for each set of contact segments, fixed to the inner body concentrically thereof and successively engaging the contact segments of the respective sets as the rotatable body rotates; means electrically connecting the magnets of the inner body in circuit with a source of current supply; a set of control contact segments mounted on said outer body concentrically thereof and successively engaging one of said contact rings; means for supplying current to the other of said contact rings; and a control circuit including electrical connections to different ones of said contact segments, and a switch by which said connections can be selectively included in the control circuit to supply current to the magnets of the outer body only so long as the contact ring is engaging the particular control contact segments whose connection is included in the circuit.

8. An electrical machine of the class described comprising: two electromagnetic elements; means mounting said elements one within the other in hypocyclic relationship for relative rotation, with the space between the elements forming an air gap and the rotatable element being free to move in any direction parallel to a plane perpendicular to its axis; means co-acting with said elements to electrically energize same and produce a torque-reacting pull across said air gap upon the rotatable element effecting rotation of the latter; a power transferring member rotatably mounted in laterally spaced co-axial relationship to the non-rotatable element; and an elongated, flexible driving member operatively connecting the power transferring member and the rotatable element to transmit torque from the latter while rendering the rotatable element free to move perpendicularly to its axis as aforestated.

9. An electrical machine of the class described comprising: two relatively rotatable electromagnetic elements disposed one within the other in hypocyclic relationship; means for supplying current to one of said elements to create a stationary magnetic field; means for supplying current to the other of said elements to create magnetic fields of attraction and repulsion between the elements, coacting with said stationary magnetic field, to produce a torque-re-acting air gap pull between the elements; means co-acting with the last means to advance the fields of attraction and repulsion with the rotatable element as the latter rotates, so as to continuously utilize the air gap pull to develop the torque; and means for disrupting said fields of attraction and repulsion while said stationary field remains intact so as to produce a powerful braking and locking effect between the elements holding the rotatable element against rotation.

THEODORE W. VICKERS.